(12) United States Patent
Suwa et al.

(10) Patent No.: US 9,988,955 B1
(45) Date of Patent: Jun. 5, 2018

(54) DRY SUMP SYSTEM WARM UP STRATEGY

(71) Applicant: GM GLOBAL TECHNOLOGY OPERATIONS LLC, Detroit, MI (US)

(72) Inventors: Yujiro Suwa, Commerce Township, MI (US); Robert Benson Parrish, White Lake, MI (US); Arthur L Mcgrew, Indianapolis, IN (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 12 days.

(21) Appl. No.: 15/361,734

(22) Filed: Nov. 28, 2016

(51) Int. Cl.
*F16N 11/00* (2006.01)
*F01M 11/00* (2006.01)
*H02P 1/16* (2006.01)

(52) U.S. Cl.
CPC .......... *F01M 11/0004* (2013.01); *H02P 1/16* (2013.01); *B60L 2240/425* (2013.01); *F01M 2011/0045* (2013.01); *F01M 2011/0083* (2013.01)

(58) Field of Classification Search
None
See application file for complete search history.

(56) References Cited

U.S. PATENT DOCUMENTS

| | | | | |
|---|---|---|---|---|
| 4,418,777 A | * | 12/1983 | Stockton | ............. F16H 57/0413 180/65.6 |
| 5,217,085 A | * | 6/1993 | Barrie | ...................... F01M 1/16 165/297 |
| 9,068,645 B2 | | 6/2015 | Tamai et al. | |
| 9,156,348 B1 | | 10/2015 | Swales et al. | |
| 2008/0116009 A1 | * | 5/2008 | Sheridan | ................. F01D 25/18 184/6.4 |
| 2013/0319798 A1 | * | 12/2013 | Sheridan | ................. F01D 25/20 184/6.11 |

* cited by examiner

*Primary Examiner* — Bickey Dhakal (57) ABSTRACT

A drive unit, method, and control system are provided that warm drive unit fluid in a drive unit having a main pump, a scavenge pump, and an electric motor for powering an axle of a vehicle. The control system and method are configured to fill a main sump of the drive unit with drive unit fluid to a predetermined fill level. In a warm-up mode, the method and control system operate the electric motor to heat the drive unit fluid within the main sump while the vehicle is stationary and the electric motor is at least partially disposed in the drive unit fluid within the main sump. Further in the warm-up mode, the method and control system are configured to operate the scavenge pump to pump the drive unit fluid from the main sump into an auxiliary reservoir after the drive unit fluid has been heated by the electric motor.

20 Claims, 7 Drawing Sheets

DRY SUMP SYSTEM WARM UP STRATEGY

TECHNICAL FIELD

The present disclosure relates to a strategy for warming fluid in a dry sump system in a motor vehicle propulsion system assembly, such as a drive unit or transmission assembly.

INTRODUCTION

A drive unit may include a gear assembly for implementing an all-wheel drive functionality within a vehicle. The drive unit may be an electric drive unit, including an electric motor and an electric main pump for feeding drive unit fluid to the electric motor, the gear assembly, and other drive unit components.

The flow of oil or fluid within a vehicle transmission or drive unit is controlled in a manner to lubricate moving components contained therein and to actuate various subsystems, such as clutches, when needed. A transmission or drive unit assembly typically includes a sump volume configured to store such fluid, as well as to provide desired amounts of the fluid to various components and subsystems within the drive unit or transmission. In some vehicles, it is desirable to implement a dry sump system, in order to provide better more direct lubrication to the drive unit or transmission components, as well as to lower the center of gravity, among other advantages.

Though it may be advantageous to implement a small, low voltage, electric main pump for pumping the drive unit fluid to the drive unit or transmission assembly, the fluid becomes more viscous at lower temperatures, and if the ambient temperature of the fluid is cold enough, a low voltage pump may not be able to operate within the viscous fluid at such low temperatures.

SUMMARY

Accordingly, the present disclosure provides a dry sump fluid warm-up strategy in an electric drive unit or transmission that warms up fluid by using the electric motor to churn the fluid so that the fluid is warm enough to be pumped by a main pump.

In one form, which may be combined with or separate from the other forms disclosed herein, a drive unit for a motor vehicle is provided. The drive unit includes an electric motor configured to generate torque, the electric motor comprising a rotor configured to rotate with respect to a stator. A housing surrounds the electric motor. A main pump is configured to pump drive unit fluid into the housing. A main sump is configured to collect the drive unit fluid pumped into the housing. A scavenge pump is configured to pump at least a portion of the drive unit fluid from the main sump into an auxiliary reservoir configured to hold drive unit fluid pumped by the scavenge pump. A control system is configured to operate the electric motor in a warm-up mode while the motor vehicle is stationary and drive unit fluid is disposed within the main sump to at least a predetermined fill level. The electric motor is configured to heat the drive unit fluid disposed within the main sump in the warm-up mode. The control system is configured to operate the scavenge pump to pump the drive unit fluid into the auxiliary reservoir after the drive unit fluid has been heated by the electric motor in the warm-up mode.

In another form, which may be combined with or separate from the other forms disclosed herein, the present disclosure includes a method of warming drive unit fluid in a drive unit having a main pump, a scavenge pump, and an electric motor for powering an axle of a motor vehicle. The method includes a step of filling a main sump of the drive unit with drive unit fluid to at least a predetermined fill level. In a warm-up mode, the method includes a step of operating the electric motor to heat the drive unit fluid within the main sump while the vehicle is stationary and the electric motor is at least partially disposed in the drive unit fluid within the main sump. The method further includes operating the scavenge pump to pump the drive unit fluid from the main sump into an auxiliary reservoir after the drive unit fluid has been heated by the electric motor in the warm-up mode.

In yet another form, which may be combined with or separate from the other forms disclosed herein, a control system is provided that is configured to warm drive unit fluid in a drive unit having a main pump, a scavenge pump, and an electric motor for powering an axle of a motor vehicle. The control system comprises an instruction set configured to execute the following instructions: in a warm-up mode, operate the electric motor to heat drive unit fluid disposed within a main sump while the motor vehicle is stationary and the electric motor is at least partially disposed in the drive unit fluid disposed within the main sump; and operate the scavenge pump to pump the drive unit fluid from the main sump into an auxiliary reservoir after the drive unit fluid has been heated by the electric motor in the warm-up mode.

Further additional features may be provided, including but not limited to the following: wherein the stator of the electric motor is configured to heat the drive unit fluid as the rotor moves through the drive unit fluid; the drive unit further comprising a planetary gear transmission coupled to the electric motor to power an axle of the motor vehicle; wherein the main pump is an electric pump; wherein the main pump is a 12 Volt DC electric pump; the drive unit further comprising structure defining a leak passage fluidly connecting the auxiliary reservoir to the main sump; the leak passage being configured to allow drive unit fluid to drain from the auxiliary reservoir to the main sump to at least the predetermined fill level; wherein the control system is configured to cause the main pump to pump the drive unit fluid into the main sump to the predetermined fill level at a turn-off time of the motor vehicle, the turn-off time being a time when the motor vehicle is turned off; the control system being configured to determine whether the main pump and the scavenge pump are turned off prior to the electric motor being operated in the warm-up mode; the control system being configured to cause the main pump and scavenge pump to be turned off prior to operating the electric motor in the warm-up mode if the control system determines that at least one of the main pump and the scavenge pump are not turned off; wherein the main pump is configured to pump the drive unit fluid onto the electric motor and the planetary gear transmission during a normal operating mode of the drive unit; the scavenge pump being configured to pump the drive unit fluid out of the main sump into the auxiliary reservoir in the normal operating mode; the method further comprising leaking drive unit fluid through a leak passage from the auxiliary reservoir to the main sump until the main sump is filled with drive unit fluid to at least the predetermined fill level; the method further comprising pumping the drive unit fluid via the main pump into the main sump to the predetermined fill level at a turn-off time of the motor vehicle, the turn-off time being a time when the motor vehicle is turned off; the method including determining whether the main pump and the scavenge pump are running prior to the electric motor being operated in the warm-up mode, and if at least one of the main pump and the scavenge pump are running prior to the electric motor being operated in the warm-up mode, shutting off at least one of the main pump and the scavenge pump until both of the main pump and the scavenge pump are shut off; the method further comprising pumping the drive unit fluid via the main pump onto the electric motor and a planetary gear transmission connected to the electric motor during a normal operating mode of the drive unit, and pumping the drive unit fluid via the scavenge pump out of the main sump into the auxiliary reservoir in the normal operating mode; and the control system being further configured to fill the main sump with the drive unit fluid to at least a predetermined fill level.

The above features and advantages, and other features and advantages of the present disclosure, will be readily apparent from the following detailed description of the many aspects of the present disclosure when taken in connection with the accompanying drawings and appended claims.

BRIEF DESCRIPTION OF THE DRAWINGS

The drawings are included for illustration only and are not intended to limit the scope of this disclosure or the appended claims.

DETAILED DESCRIPTION

Referring to the drawings, wherein like reference numbers correspond to like or similar components throughout the several figures, a motor vehicle is illustrated and generally designated at 10. The motor vehicle 10 may be any type of vehicle, such as a car, truck, van, sport-utility vehicle, etc.

Figure 1:
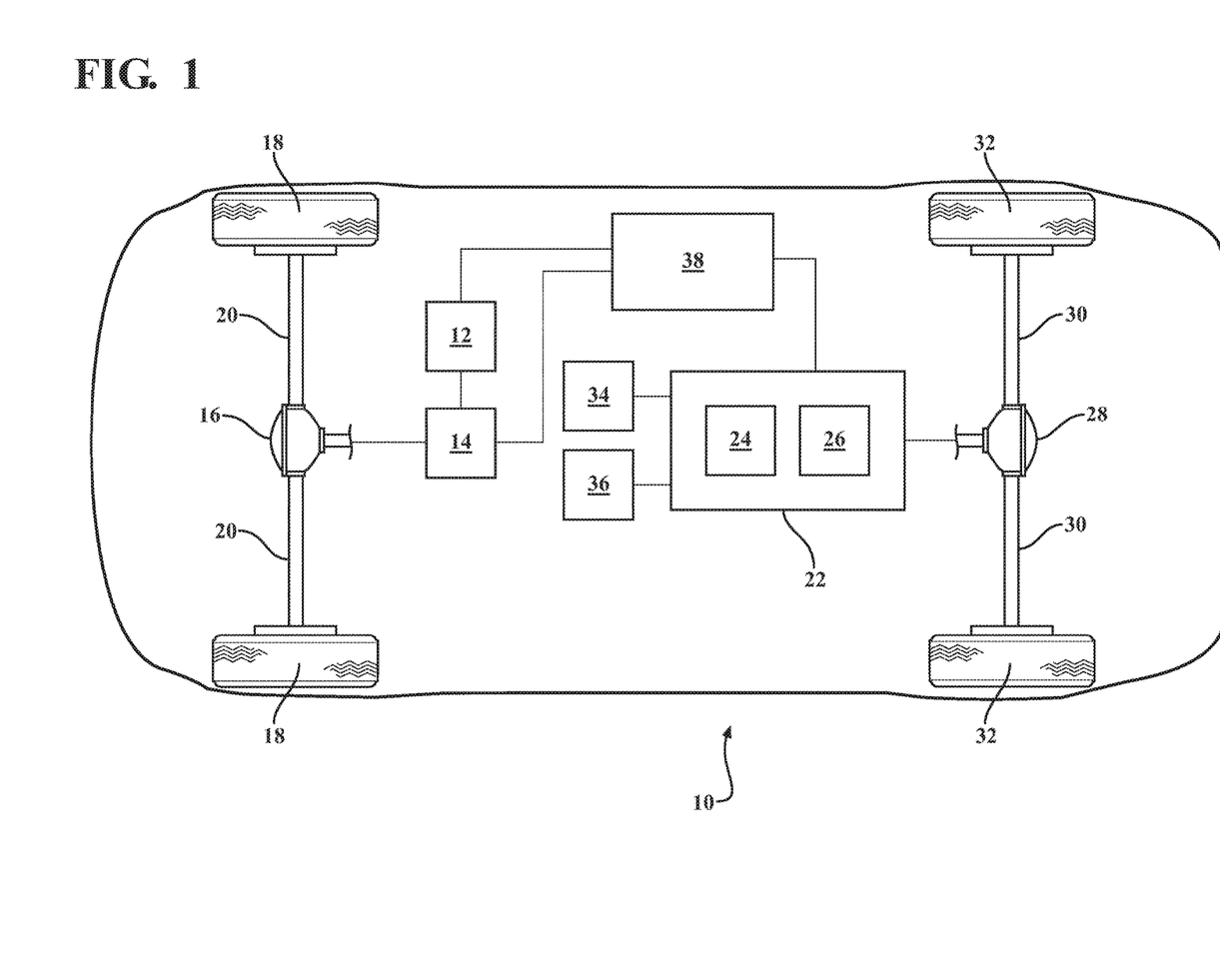
FIG. 1 is a schematic plan view of a motor vehicle system including a drive unit having an electric motor, in accordance with the principles of the present disclosure.

The motor vehicle 10 includes a main engine 12 (which could be an internal combustion engine, an electric engine, or a hybrid, by way of example). The main engine 12 is interconnected with a transmission 14 and a final drive unit 16. The transmission 14 may be a stepped transmission having planetary gears, a countershaft transmission, a continuously variable transmission, or an infinitely variable transmission. Torque from the transmission 14 is communicated through the final drive unit 16 to a first set of drive wheels 18, which may be front or rear wheels. The final drive unit 16 generally includes a differential that transfers torque through axles 20 to the drive wheels 18.

The vehicle 10 also includes an electric drive unit 22 for all-wheel-drive (AWD) applications, by way of example. The drive unit 22 includes an electric traction motor 24 coupled to a secondary transmission 26. The secondary transmission 26 is connected to another final drive unit 28, which generally includes a differential that transfers torque through a second set of axles 30 to a second set of drive wheels 32. Thus, the electric motor 24 generates torque that is ultimately applied to the second set of wheels 32 when AWD applications are selected or when it is otherwise desirable to drive the second set of wheels 32. The electric motor 24 may be interconnected with a 12 Volt vehicle battery 34, and also to a high voltage battery 36 used in hybrid or electric vehicles, such as 360 Volt hybrid battery. Both batteries 34, 36 may be connected to the electric motor 24 through a power inverter (not shown). The engine 12, transmission 14, and drive unit 22 may be controlled by a control system 38, which may include one or more controllers (not shown in detail), by way of example.

Figure 2:
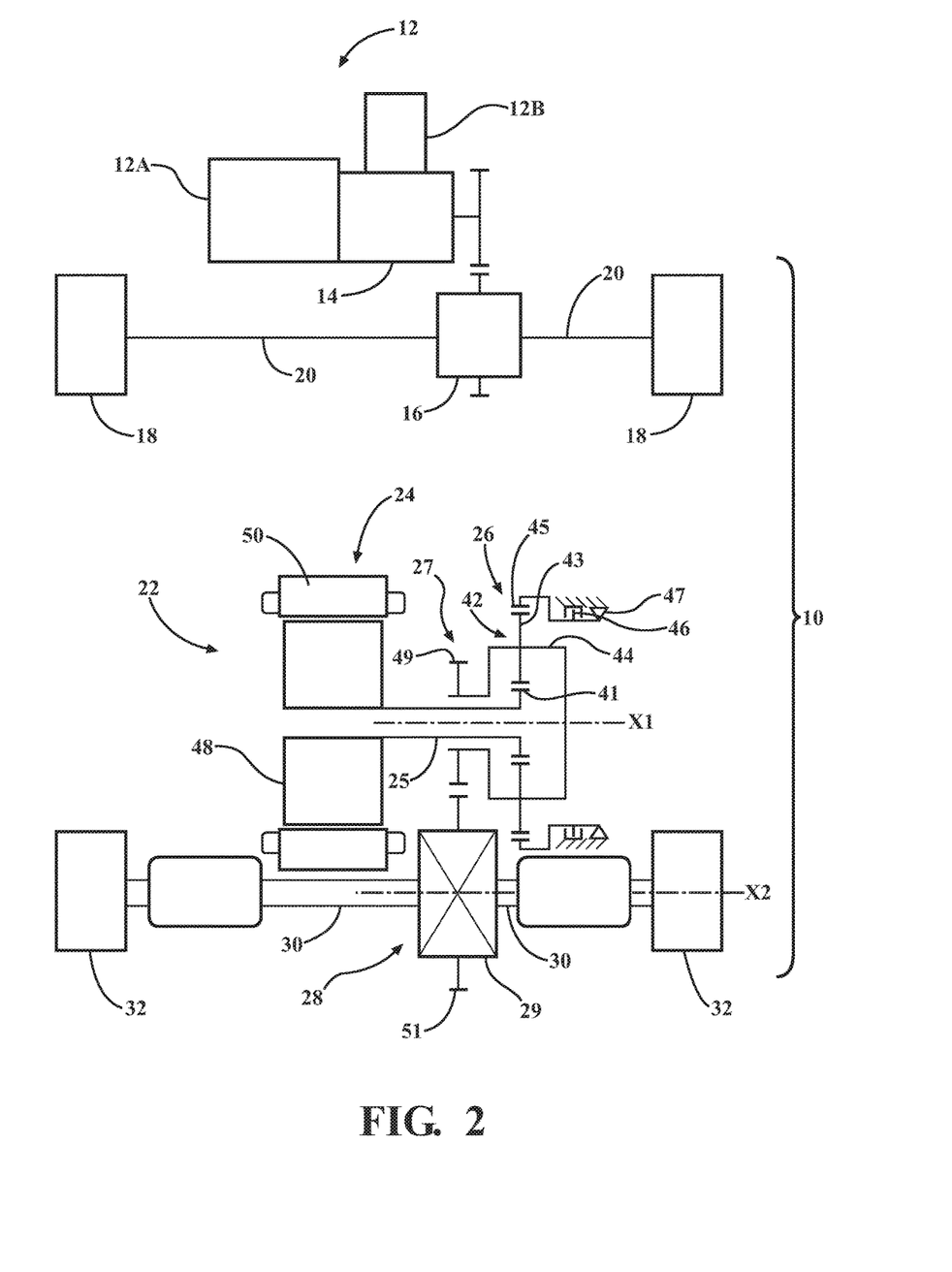
FIG. 2 is a schematic view of the motor vehicle system shown in FIG. 1, including the drive unit, according to the principles of the present disclosure.

Referring now to FIG. 2, a schematic diagram of the powertrain of the vehicle system 10 is illustrated, including the engine 12, transmission 14, and drive unit 22. The drive unit 22 is a two-axis electric drive, in this example. The drive unit 22 includes the electric motor 24 that provides drive torque to the secondary transmission 26. The secondary transmission 26 may include a planetary gear assembly 42 that provides drive torque to a transfer gear mechanism 27 that provides drive torque to the final drive unit 28. The final drive unit 28 may include a differential 29 that provides drive torque to the second set of drive wheels 32 through left and right half shafts 30.

The electric motor 24 may include a rotor 48 and a stator 50. The rotor 48 may be rotatable with respect to the stator 50 about a first axis X1. A motor output shaft 25 can be connected to the rotor 48. The planetary gear assembly 42 may include a sun gear 41 drivingly connected to the motor output shaft 25. A plurality of planetary gears 43 that are supported by a planetary carrier 44 are in meshing engagement with the sun gear 41. A ring gear 45 is in meshing engagement with each of the planetary gears 43. A brake 46 may be connected to the ring gear 45. A one-way clutch 47 allows the ring gear 45 to be fully braked during electric driving to allow for the use of a smaller plate brake 46. The planetary carrier 44 is also connected to a first transfer gear 49 of the transfer gear mechanism 27. The first transfer gear 49 is meshingly engaged with a second transfer gear 51 that is rotatable about a second axis X2. The second transfer gear 51 is drivingly connected to the differential 29 that provides drive torque to the left and right half shafts 30.

The drive unit 22 uses a planetary gear assembly 42 as a primary reduction and utilizes the transfer gear mechanism 27 as a two-axis secondary reduction. The arrangement enables a high motor to axle ratio with only two axes, without passing the axle shaft through the motor 24, thereby allowing the size of the motor 24 and its bearings to be minimized. The transfer gear mechanism 27 is positioned axially between the motor 24 and the planetary gear assembly 42, in this example, which centralizes the differential 29.

It should be understood that alternative differential mechanisms can be utilized including a planetary gear differential. In addition, alternative brake arrangements can be provided including a dog brake, selectable one-way clutch brake, or other type of braking mechanism.

The drive unit 22 can be utilized in a hybrid electric vehicle that includes an internal combustion engine 12A and a motor generator 12B that drives the primary drive wheels 18 via the transmission 14, primary final drive unit 16 and axles 20. The powertrain 60 can optionally include a motor generator 72 that assists in driving the drive wheels 64. It should be understood that the powertrain 60 can have various arrangements. The disconnect brake 38 on the ring gear 36 of the planetary gear assembly 14 allows the electric drive 10 to be disconnected from the drive wheels 20 when the powertrain 60 is driving the vehicle 2 at high speeds.

Figure 3:
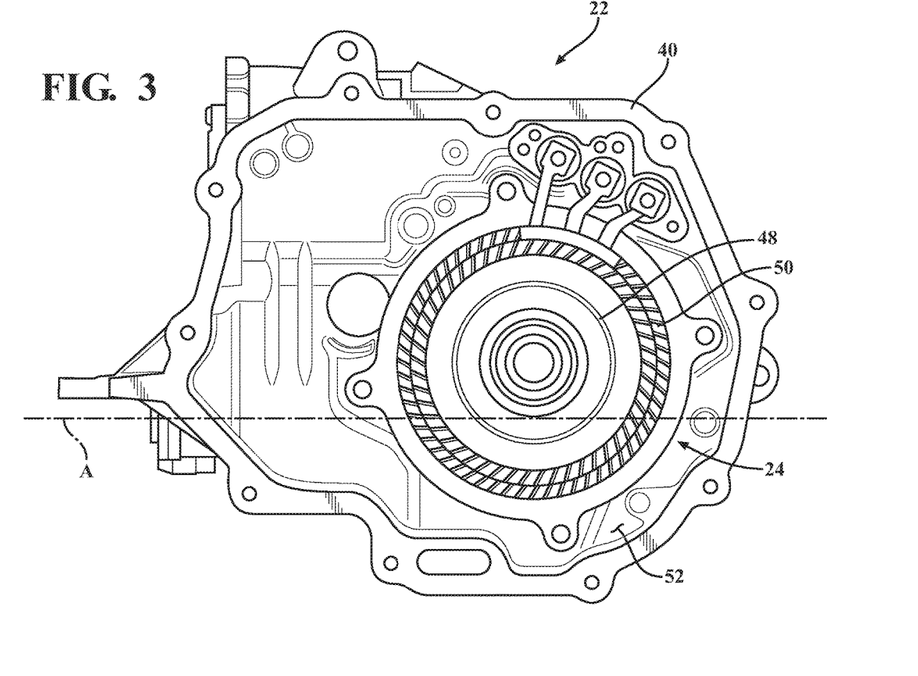
FIG. 3 is a schematic end cross-sectional view of one example of the drive unit shown in FIGS. 1-2, in accordance with the principles of the present disclosure.

Referring now to FIG. 3, a cross-sectional view of the drive unit 22 is illustrated, taken along line 3-3 of FIG. 2. The drive unit 22 includes a housing 40 having a bottom 51 that forms a main sump 52 within the housing 40. The electric motor 24 and the secondary transmission 26 are disposed within the housing 40. The main sump 52 is configured to collect drive unit fluid that is pumped into the housing 40. The drive unit fluid may be applied to the electric motor 24 and to the secondary transmission 26, for example, to lubricate components of the electric motor 24 and the secondary transmission 26. An axis A indicates a predetermined fill level for operating the drive unit 22 in fluid warm-up mode, which will be explained in further detail below. Under normal operating conditions, however, the main sump is a "dry sump" with very low levels of fluid contained therein because as the drive unit fluid accumulates within the main sump 52, it is pumped out into an auxiliary reservoir.

Figure 4:
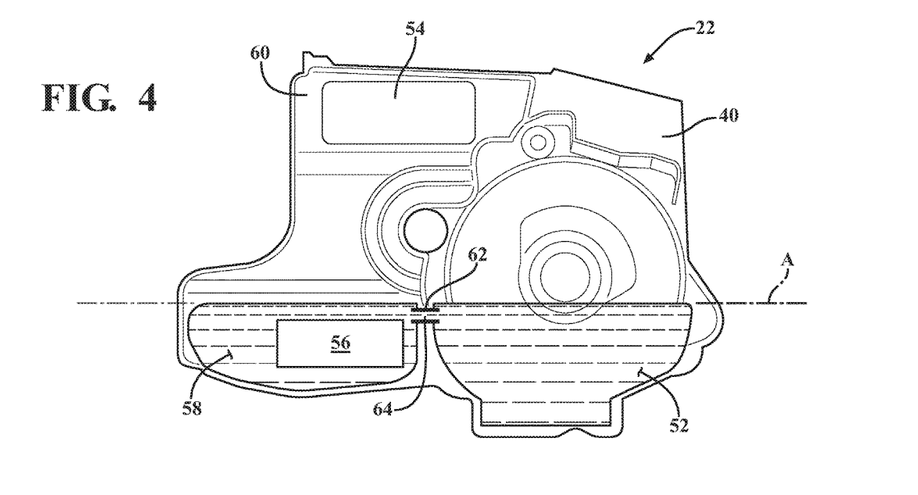
FIG. 4 is a schematic end cross-sectional view of the drive unit of shown in FIGS. 1-3 showing drive unit fluid in phantom filled to a predetermined fill line, according to the principles of the present disclosure.

For example, referring to FIG. 4, and with continued reference to FIG. 3, the drive unit 22 may include a main pump 54 operable to pump drive unit fluid into the housing 40 of the drive unit 22 to lubricate the drive unit components 24, 26. In some examples, the main pump 54 may be connected to a series of tubes (not shown) leading to the particular components to which the main pump 54 delivers the drive unit fluid, to ensure that the drive unit fluid reaches the desired components within the drive unit 22.

The drive unit 22 also includes a scavenge pump 56 operable to pump drive unit fluid from the main sump 52 and into an auxiliary reservoir 58. The scavenge pump 56 is configured to pump a majority of the drive unit fluid out of the main sump 52 during normal operation so that the main sump 52 will essentially be a dry sump. The auxiliary reservoir 58 is configured to hold the drive unit fluid pumped by the scavenge pump 56 into the auxiliary reservoir 58. The auxiliary reservoir 58 may hold drive unit fluid up to a level at a top portion 60 of the auxiliary reservoir 58 near the main pump 54. However, in FIG. 4, the drive unit 22 is shown in a warm-up mode, wherein a substantial portion of the drive unit fluid is disposed in the main sump 52. A side cover 61 may optionally be removably mounted to the drive unit housing 40, so that the side cover 61 and the drive unit housing 40 cooperate to define the auxiliary reservoir 58 having a predefined auxiliary volume. In FIG. 4, the main pump 54 and the scavenge pump 56 are illustrated schematically, and it should be understand that these pumps may be configured in any suitable way.

In some variations, the drive unit 22 may include structure 62 defining a leak passage 64 fluidly connecting the auxiliary reservoir 58 to the main sump 52. The leak passage 64 is configured to allow drive unit fluid to drain from the auxiliary reservoir 58 to the main sump 52 to at least the predetermined fill level A.

The control system 38 is configured to operate the drive unit 22 in a warm-up mode and in a normal operating mode. The warm-up mode is used to heat up drive unit fluid if the drive unit fluid is too cold to be pumped successfully by the main pump 54. The main pump 54 may be provided as a low-power, small 12 VDC electric pump that is not strong enough to pump drive unit fluid that increases in viscosity as temperature decreases. Thus, the warm-up mode may be used, for example, when temperatures are below 0 degrees Celsius.

Figure 5:
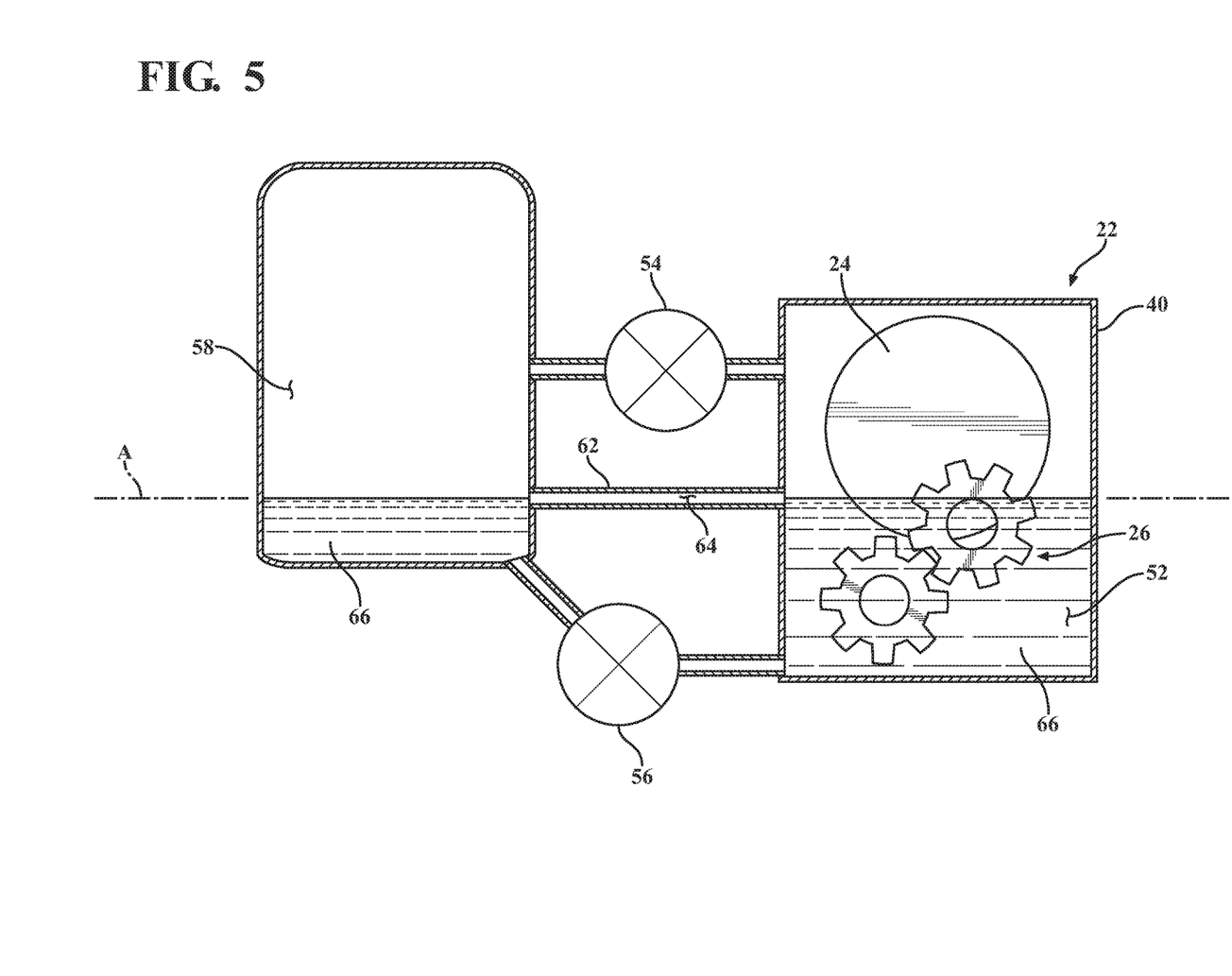
FIG. 5 is a schematic representation of the drive unit of FIGS. 1-4 shown during operation in a warm-up mode, in accordance with the principles of the present disclosure.

Referring to FIG. 5, in the warm-up mode, drive unit fluid 66 is disposed in the main sump 52 to at least the predetermined fill line A. The drive unit fluid 66 may be added to the main sump 52 through the leak passage 64, by way of example. In the warm-up mode, the control system 38 operates the electric motor 24 while keeping the vehicle 10 stationary. The rotor 48 of the electric motor 24 churns through and shears the drive unit fluid 66 that is disposed in the main sump 52, causing the drive unit fluid 66 to be heated by the stator 50, in the warm-up mode. After the drive unit fluid 66 is heated, the control system 38 operates the scavenge pump 56 to pump the drive unit fluid 66 into the auxiliary reservoir 58. The control system 38 may determine that the drive unit fluid 66 is heated enough by measuring the temperature of the drive unit 66, or merely by waiting for a predetermined amount of time to pass while the electric motor 24 is churning through and heating the drive unit fluid 66, by way of example.

The control system 38 may be configured to determine whether the main pump 54 and the scavenge pump 56 are turned off prior to the electric motor 24 being operated in the warm-up mode. If the control system 38 determines that either or both of the main pump 54 or the scavenge pump 56 are running, the control system 38 is configured to cause the main pump 54 and scavenge pump 56 to be turned off (or shut off) prior to operating the electric motor 24 in the warm-up mode. The scavenge pump 56 is configured to remove drive unit fluid 66 from the main sump 52, but in the warm-up mode, it is desired that the drive unit fluid 66 remain in the main sump 52 so that the drive unit fluid 66 can be heated by the electric motor 24.

Figure 6:
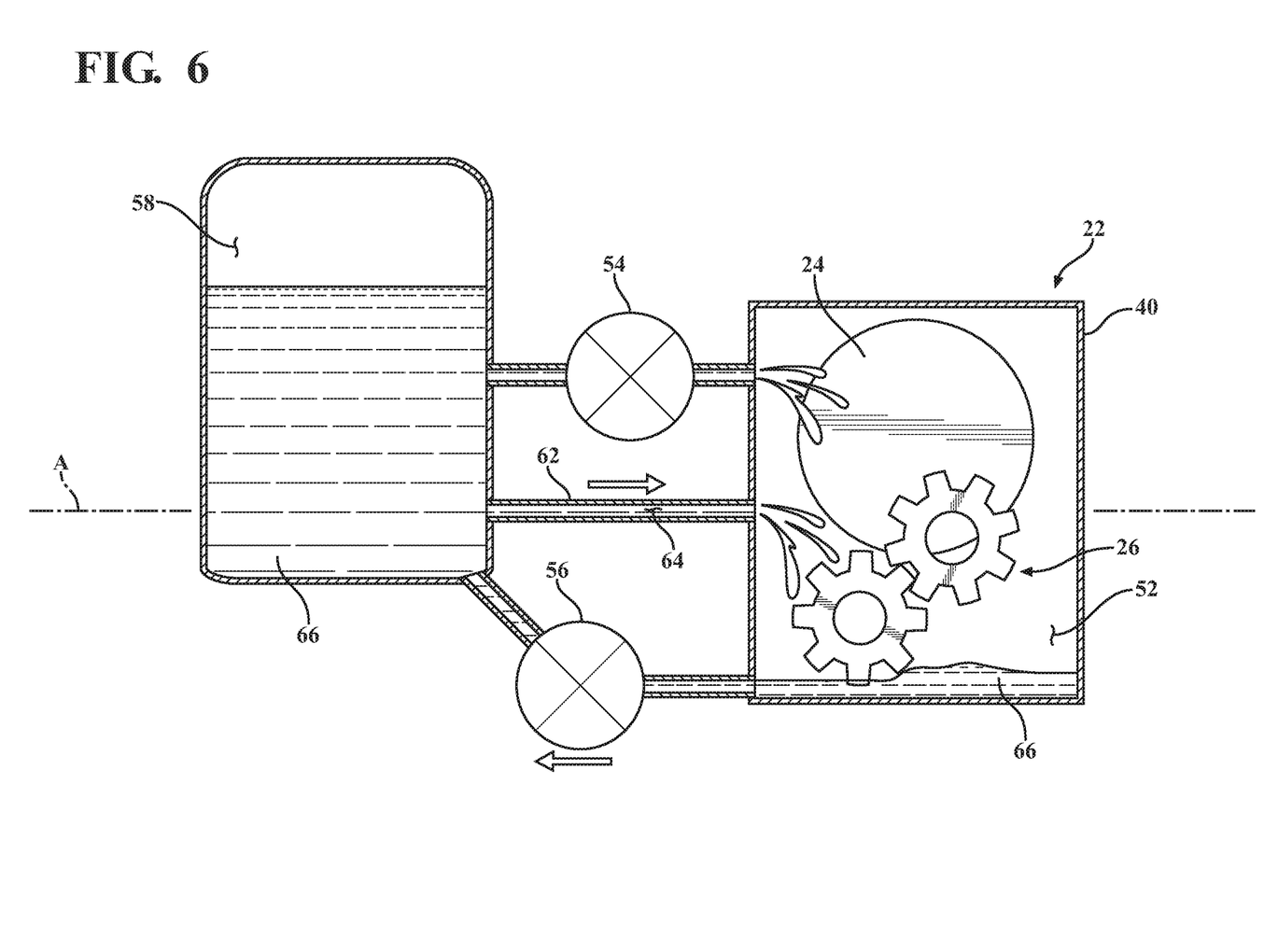
FIG. 6 is a schematic representation of the drive unit of FIGS. 1-5 shown during operation in normal operating mode, according to the principles of the present disclosure.

Referring now to FIG. 6, in a normal operating mode of the drive unit 22, the drive unit fluid 66 is warm enough so that it possesses a sufficiently low level of viscosity to allow the main pump 54 to pump the drive unit fluid 66 into the drive unit 22 during normal operation of the drive unit 22. Thus, in the normal operating mode, the main pump 54 is configured to draw the drive unit fluid 66 from the auxiliary reservoir 58 and pump the drive unit fluid 66 under pressure onto the electric motor 24 and the planetary gear transmission 26, and any other desired parts of the drive unit 22. In the normal operating mode, the scavenge pump 56 is configured to pump the drive unit fluid 66 out of the main sump 52 into the auxiliary reservoir 58. The scavenge pump 56, thus, collects the drive unit fluid 66 out of the main sump 52 so that the main sump 52 has only an insubstantial low level of drive unit fluid 66 contained therein and is essentially a dry sump. Therefore, in the normal operating mode, the little drive unit fluid 66 disposed in the main sump 52 may not come in contact with the electric motor 24, so that the electric motor 24 does not sit in a bath of drive unit fluid 66.

In another variation, instead of, or in addition to, including the leak passage 64, the drive unit fluid 66 may be added to the main sump 52 by the main pump 54 prior to the drive unit fluid 66 cooling down. For example, the scavenge pump 56 may be turned off when the vehicle is turned off (at key-off, e.g.), at a turn-off time, but the main pump 54 may be allowed to run to fill the main sump 52 to at least the predetermined level A. Then, when the drive unit fluid 66 cools down below the temperature threshold, the drive unit fluid 66 is already located in the main sump 52 and can be warmed by the electric motor 24 in the warm-up mode before being pumped into the auxiliary reservoir by the scavenge pump 56.

Figure 7A:
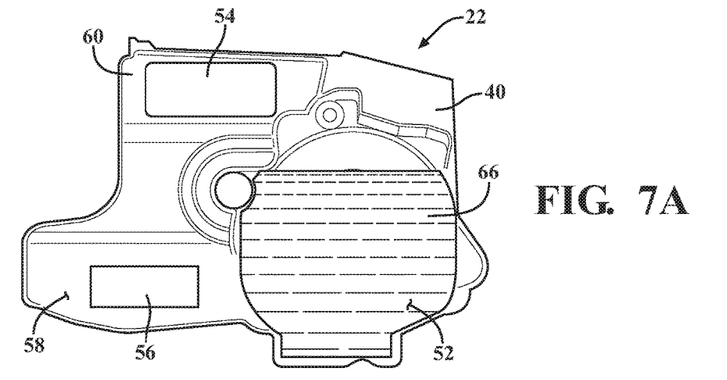
FIG. 7A is a schematic end cross-sectional view of another variation of the drive unit of FIGS. 1-2 showing drive unit fluid in phantom filled to a predetermined fill line, in accordance with the principles of the present disclosure.
Figure 7B:
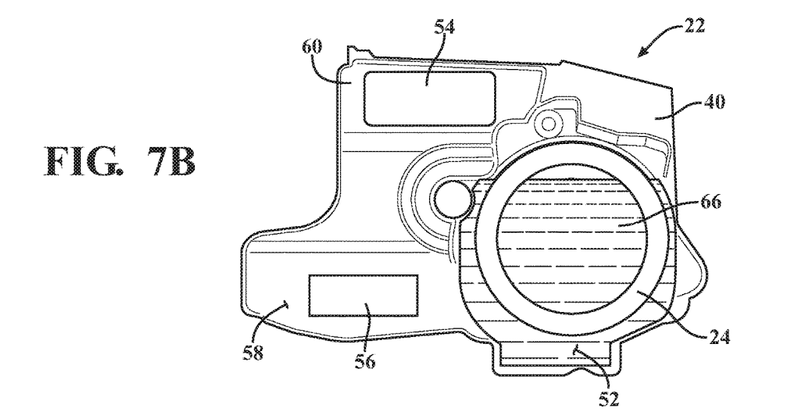
FIG. 7B is a schematic end cross-sectional view of the drive unit of FIG. 7A in a warm-up mode, according to the principles of the present disclosure.
Figure 7C:
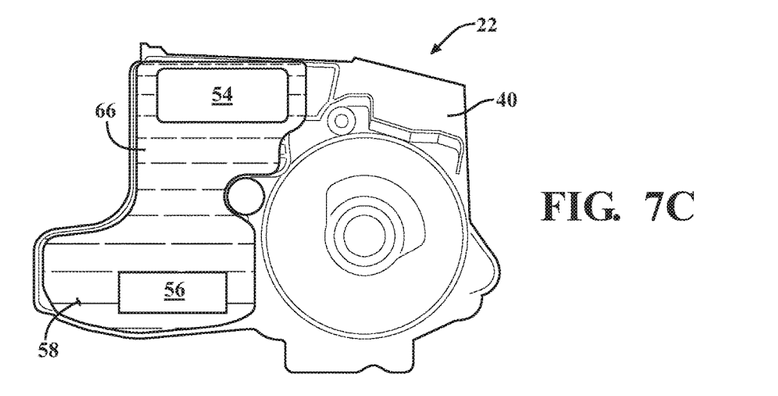
FIG. 7C is a schematic end cross-sectional view of the drive unit of FIGS. 7A-7B in a normal operating mode, in accordance with the principles of the present disclosure.

FIGS. 7A-7C schematically illustrate three stages of the drive unit 22 system. In FIG. 7A, the main sump 52 is filled with drive unit fluid 66 at the vehicle turn-off time, or at any other desirable time. In FIG. 7B, when the vehicle 10 is started and the drive unit fluid 66 is too cold to be pumped by the main pump 54, the warm-up mode is selected and the electric motor 24 is used to churn through the drive unit fluid 66 that is located within the main sump 52 to heat the drive unit fluid 66. Referring to FIG. 7C, after the drive unit fluid 66 has been heated by the electric motor 24, the drive unit 22 enters the normal operating mode and the drive unit fluid 66 is kept in the auxiliary reservoir by the scavenge pump 56, which continuously pumps the drive unit fluid 66 out of the main sump 52 and into the auxiliary reservoir 58. As explained above, in the normal operating mode, the drive unit fluid 66 is continually pumped into the drive unit housing 40 by the main pump 54 and removed from the main sump 52 by the scavenge pump 56.

Figure 8:
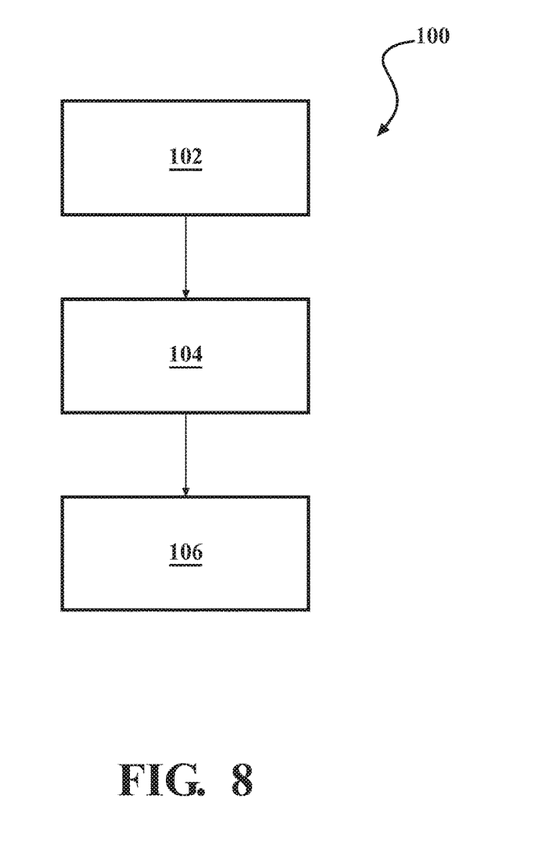
FIG. 8 is a block diagram illustrating a method of warming drive unit fluid in a drive unit having a main pump, a scavenge pump, and an electric motor for powering an axle of a motor vehicle.

Referring now to FIG. 8, a block diagram illustrates a method 100 of warming drive unit fluid in a drive unit having a main pump, a scavenge pump, and an electric motor for powering an axle of a motor vehicle. The method 100 may incorporate elements and functionalities of the drive unit 22 described above, by way of example.

The method 100 includes a step 102 of filling a main sump of the drive unit with drive unit fluid to at least a predetermined fill level. In a warm-up mode, the method 100 includes a step 104 of operating the electric motor to heat the drive unit fluid within the main sump while the motor vehicle is stationary and the electric motor is at least partially disposed in the drive unit fluid that is disposed within the main sump. Further in the warm-up mode, the method 100 includes a step 106 of operating the scavenge pump to pump the drive unit fluid from the main sump into an auxiliary reservoir after the drive unit fluid has been heated by the electric motor.

The method 100 may include any desired additional elements and steps, such as those described above with respect to FIGS. 1-7C. For example, the method 100 may include providing the main pump as an electrically operated pump. The method 100 may include leaking drive unit fluid through a leak passage from the auxiliary reservoir to the main sump until the main sump is filled with drive unit fluid to at least the predetermined fill level. The method 100 may additionally or alternatively include pumping the drive unit fluid via the main pump into the main sump to at least the predetermined fill level at a turn-off time of the motor vehicle, the turn-off time being a time when the motor vehicle is turned off.

In addition, the method 100 may include determining whether the main pump and the scavenge pump are running prior to the electric motor being operated in the warm-up mode, and if one or both of the main pump and the scavenge pump are running prior to the electric motor being operated in the warm-up mode, the method 100 may include shutting off the main pump and/or the scavenge pump until both of the main pump and the scavenge pump are shut off. The method 100 may also operate in a normal operating mode, which includes pumping the drive unit fluid via the main pump onto the electric motor and a planetary gear transmission connected to the electric motor and pumping the drive unit fluid via the scavenge pump out of the main sump into the auxiliary reservoir.

The control system 38 preferably includes at least one controller, but may include a plurality of controller devices wherein each of the controllers may be associated with monitoring and controlling a single system. This may include an engine control module (ECM) for controlling the engine 12, a transmission controller (TCM) for controlling the transmission 14, and one or more other controllers for controlling the drive unit 22.

The control system 38 preferably includes at least one processor and at least one memory device (or any non-transitory, tangible computer readable storage medium) on which are recorded instructions for executing instruction sets for controlling the parts of the drive unit 22, including the electric motor 24, the main pump 54, and the scavenge pump 56. The memory device can store controller-executable instruction sets, and the processor can execute the controller-executable instruction sets stored in the memory.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The control system 38 may be configured to execute each of the steps of the method 100. Thus, the entire description with respect to FIGS. 1-7C may be applied by the control system 38 to effectuate the method 100 shown in FIG. 8. Furthermore, the control system 38 may be or include a controller that includes a number of control logics that are configured to execute the steps of the method 100.

The controller(s) of the control system 38 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the many aspects of the present disclosure. While certain aspects have been described in detail, various alternative aspects exist for practicing the invention as defined in the appended claims.

What is claimed is:

1. A drive unit for a motor vehicle, the drive unit comprising:
   an electric motor configured to generate torque, the electric motor comprising a rotor configured to rotate with respect to a stator;
   a housing surrounding the electric motor;
   a main pump configured to pump drive unit fluid into the housing;
   a main sump configured to collect the drive unit fluid pumped into the housing;
   a scavenge pump configured to pump at least a portion of the drive unit fluid from the main sump;
   an auxiliary reservoir configured to hold drive unit fluid pumped by the scavenge pump; and
   a control system configured to operate the electric motor in a warm-up mode while the motor vehicle is stationary and the drive unit fluid is disposed within the main sump to at least a predetermined fill level, the electric motor being configured to heat the drive unit fluid disposed within the main sump in the warm-up mode, the control system being configured to operate the scavenge pump to pump the drive unit fluid into the auxiliary reservoir after the drive unit fluid has been heated by the electric motor in the warm-up mode.

2. The drive unit of claim 1, wherein the stator of the electric motor is configured to heat the drive unit fluid as the rotor moves through the drive unit fluid.

3. The drive unit of claim 2, further comprising a planetary gear transmission coupled to the electric motor to power an axle of the motor vehicle.

4. The drive unit of claim 3, wherein the main pump is an electric pump.

5. The drive unit of claim 4, wherein the main pump is a 12 Volt DC electric pump.

6. The drive unit of claim 4, further comprising structure defining a leak passage fluidly connecting the auxiliary reservoir to the main sump, the leak passage being configured to allow drive unit fluid to drain from the auxiliary reservoir to the main sump to at least the predetermined fill level.

7. The drive unit of claim 4, wherein the control system is configured to cause the main pump to pump the drive unit fluid into the main sump to the predetermined fill level at a turn-off time of the motor vehicle, the turn-off time being a time when the motor vehicle is turned off.

8. The drive unit of claim 4, the control system being configured to determine whether the main pump and the scavenge pump are turned off prior to the electric motor being operated in the warm-up mode, the control system being configured to cause the main pump and scavenge pump to be turned off prior to operating the electric motor in the warm-up mode if the control system determines that at least one of the main pump and the scavenge pump are not turned off.

9. The drive unit of claim 8, wherein the main pump is configured to pump the drive unit fluid onto the electric motor and the planetary gear transmission during a normal operating mode of the drive unit, the scavenge pump being configured to pump the drive unit fluid out of the main sump into the auxiliary reservoir in the normal operating mode.

10. A method of warming drive unit fluid in a drive unit having a main pump, a scavenge pump, and an electric motor for powering an axle of a motor vehicle, the method comprising:
   filling a main sump of the drive unit with drive unit fluid to at least a predetermined fill level;
   in a warm-up mode, operating the electric motor to heat the drive unit fluid within the main sump while the motor vehicle is stationary and the electric motor is at least partially disposed in the drive unit fluid within the main sump; and operating the scavenge pump to pump the drive unit fluid from the main sump into an auxiliary reservoir after the drive unit fluid has been heated by the electric motor in the warm-up mode.

11. The method of claim 10, further comprising providing the main pump as an electrically operated pump.

12. The method of claim 11, further comprising leaking drive unit fluid through a leak passage from the auxiliary reservoir to the main sump until the main sump is filled with the drive unit fluid to at least the predetermined fill level.

13. The method of claim 11, further comprising pumping the drive unit fluid via the main pump into the main sump to the predetermined fill level at a turn-off time of the motor vehicle, the turn-off time being a time when the motor vehicle is turned off.

14. The method of claim 11, further comprising:
determining whether the main pump and the scavenge pump are running prior to the electric motor being operated in the warm-up mode; and
if at least one of the main pump and the scavenge pump are running prior to the electric motor being operated in the warm-up mode, shutting off at least one of the main pump and the scavenge pump until both of the main pump and the scavenge pump are shut off during the operating of the electric motor in the warm-up mode.

15. The method of claim 14, further comprising:
pumping the drive unit fluid via the main pump onto the electric motor and a planetary gear transmission connected to the electric motor in a normal operating mode of the drive unit; and
pumping the drive unit fluid via the scavenge pump out of the main sump into the auxiliary reservoir in the normal operating mode.

16. A control system configured to warm drive unit fluid in a drive unit having a main pump, a scavenge pump, and an electric motor for powering an axle of a motor vehicle, the control system comprising an instruction set configured to execute the following instructions:
in a warm-up mode, operate the electric motor to heat drive unit fluid disposed within a main sump to at least a predetermined fill level while the motor vehicle is stationary and the electric motor is at least partially disposed in the drive unit fluid disposed within the main sump; and
operate the scavenge pump to pump the drive unit fluid from the main sump into an auxiliary reservoir after the drive unit fluid has been heated by the electric motor in the warm-up mode.

17. The control system of claim 16, wherein the control system is further configured to pump the drive unit fluid via the main pump into the main sump to the predetermined fill level at a turn-off time of the motor vehicle, the turn-off time being a time when the motor vehicle is turned off.

18. The control system of claim 17, the control system being further configured to determine whether the main pump and the scavenge pump are running prior to the electric motor being operated in the warm-up mode; and if at least one of the main pump and the scavenge pump are running prior to the electric motor being operated in the warm-up mode, the control system is configured to shut off at least one of the main pump and the scavenge pump until both of the main pump and the scavenge pump are shut off prior to beginning the warm-up mode.

19. The control system of claim 18, the control system being further configured to execute the following instructions:
pump the drive unit fluid via the main pump onto the electric motor and a planetary gear transmission connected to the electric motor during a normal operating mode of the drive unit; and
pump the drive unit fluid via the scavenge pump out of the main sump into the auxiliary reservoir in the normal operating mode.

20. The control system of claim 19, wherein the control system is further configured to fill the main sump of the drive unit with the drive unit fluid to at least the predetermined fill level.

* * * * *